United States Patent [19]

Byerly et al.

[11] Patent Number: 4,762,994

[45] Date of Patent: Aug. 9, 1988

[54] COMPACT OPTICAL SCANNER DRIVEN BY A RESONANT GALVANOMETER

[75] Inventors: Kent A. Byerly, Boulder, Colo.; Duane E. Grant, San Jose, Calif.

[73] Assignee: IBM Corp., Armonk, N.Y.

[21] Appl. No.: 928,488

[22] Filed: Nov. 10, 1986

[51] Int. Cl.⁴ .............................................. G01D 5/30
[52] U.S. Cl. .................................... 250/236; 350/6.6
[58] Field of Search ......................... 350/6.91, 6.6, 6.8, 350/6.9, 6.5, 486; 250/230, 236, 234, 235; 358/203, 285, 293

[56] References Cited

U.S. PATENT DOCUMENTS

| | | | |
|---|---|---|---|
| 3,693,022 | 9/1972 | Dumast et al. | 250/230 |
| 4,178,064 | 12/1979 | Mrdjen | 350/6.6 |
| 4,180,307 | 12/1979 | Tateoka et al. | 350/6.5 |
| 4,213,146 | 7/1980 | Maiman | 350/486 |
| 4,419,676 | 12/1983 | Lenk et al. | 346/108 |
| 4,588,887 | 5/1986 | Bailey et al. | 250/326 |
| 4,638,156 | 1/1987 | Horikawa et al. | 250/235 |

FOREIGN PATENT DOCUMENTS

| | | | |
|---|---|---|---|
| 2750261 | 5/1978 | Fed. Rep. of Germany | 350/6.6 |
| 2922823 | 12/1979 | Fed. Rep. of Germany | 350/6.6 |

Primary Examiner—David C. Nelms
Assistant Examiner—Jessica Ruoff
Attorney, Agent, or Firm—Pollock, Vande Sande & Priddy

[57] ABSTRACT

A compact optical scanner includes a base unit and a scan unit. The base unit includes an optical source such as a laser and an optical path directing a beam emitted by the laser to a scan mirror which is located in and supported by the scan unit. As the scan mirror rotates, the optical beam is reflected back to the base unit from which it is emitted as a beam scanning to and fro in a scan plane. The scan unit is supported by reference to the base unit such that the oscillation axis of the scan mirror is substantially and preferably parallel to the scan plane.

8 Claims, 2 Drawing Sheets

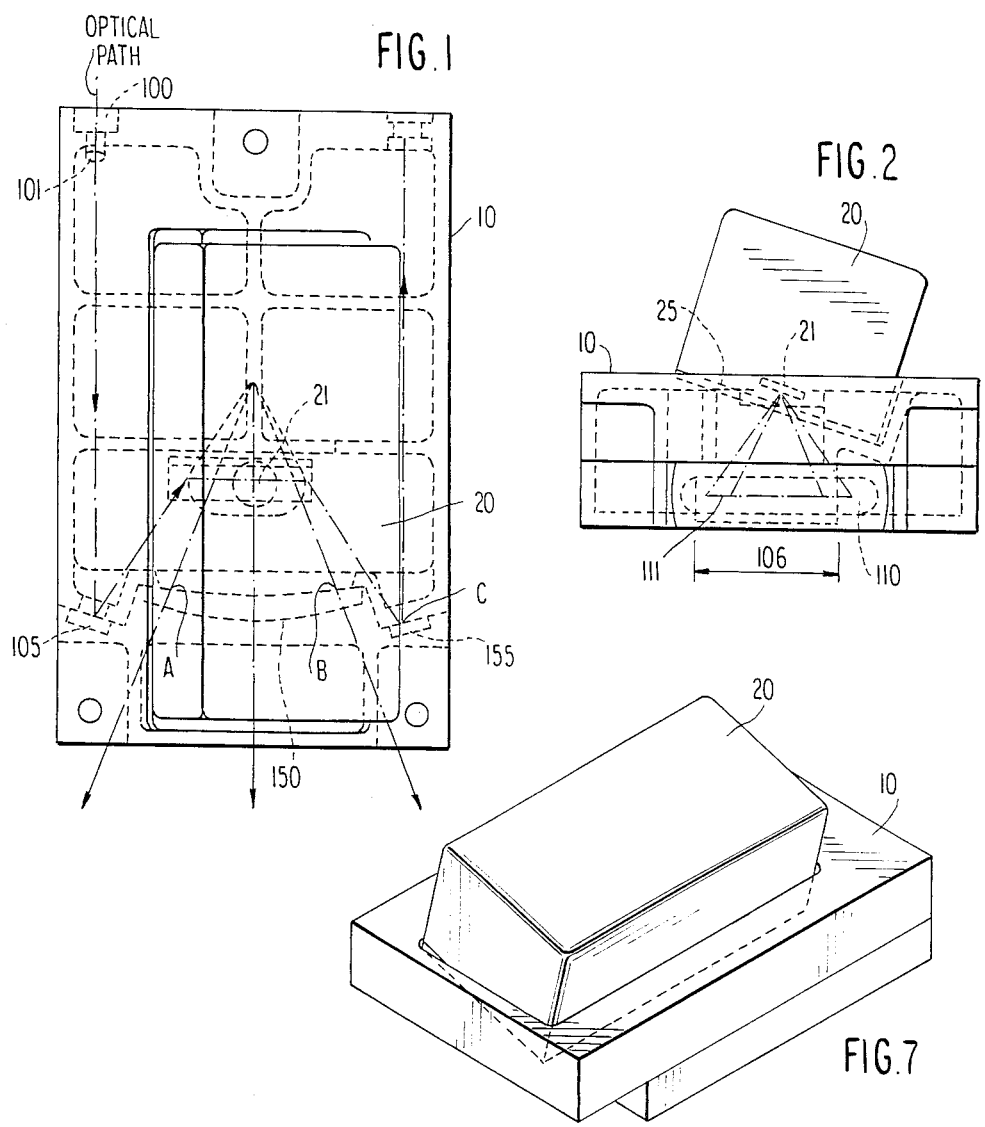
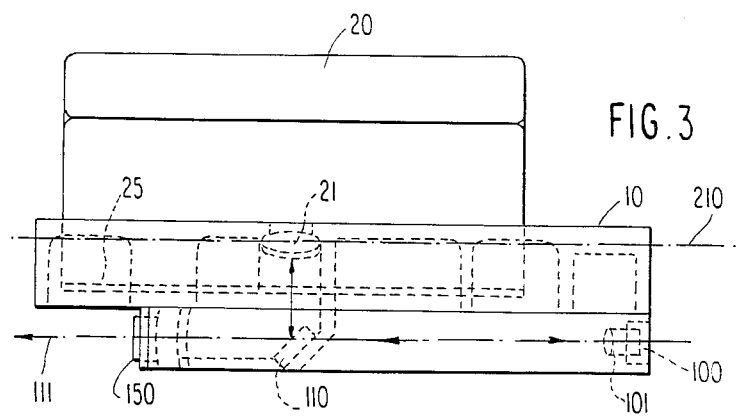

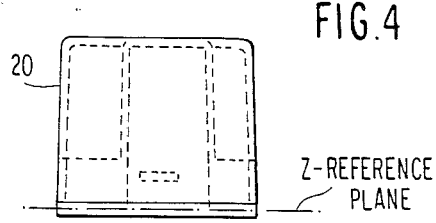
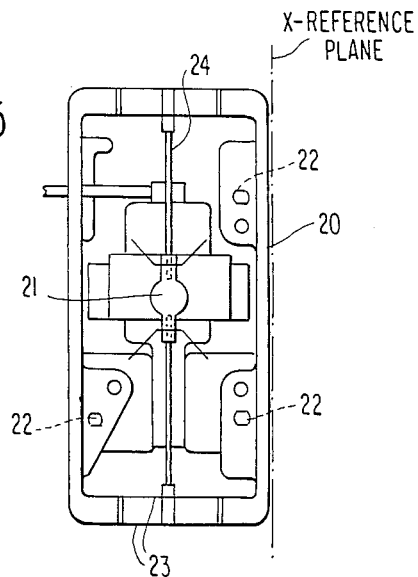
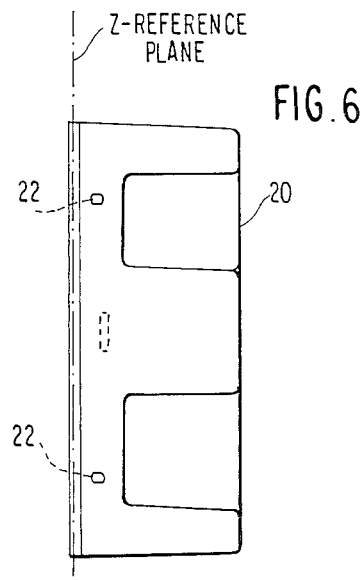
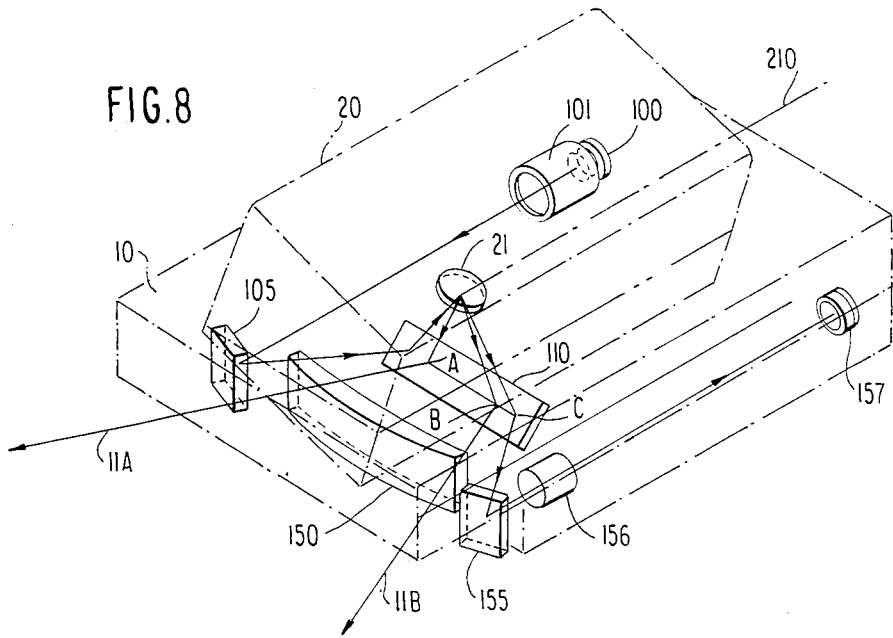

COMPACT OPTICAL SCANNER DRIVEN BY A RESONANT GALVANOMETER

DESCRIPTION

1. Field of the Invention

The invention relates to a mechanical scanning device for producing a scanning optical beam by the use of a rotating mirror wherein the mirror and its supports operate as a resonant galvanometer or torsion bar.

2. Background Art

Scanning optical beams are widely employed; an important application is in electrophotography wherein a scanning laser beam can be employed to "read" or "write" on a photoconductive surface. An important characteristic of any such mechanical scanner is that its motion be highly stable; because any real mechanical device exhibits friction, energy must be added to the scanning device. However, it is important that the manner in which energy is added be arranged so that it does not affect the stability of the scanning motion. In this regard, resonant galvanometer scanners provide a significant advantage. In such a device the scanning motion is produced by the rotation of a mirror about an axis. The mirror is supported on what is in effect a torsion bar, and the characteristics of the motion (period) are determined by the length and diameter of the torsion bar. To overcome friction, energy can be added inductively to eliminate the need for physical contact with stationary parts (which physical contact would engender additional friction). Resonant galvanometer scanners used to produce an optical scanning beam are described in U.S. Pat. Nos. 4,037,231; 4,032,888; 4,168,054 and 4,588,887.

Another important characteristic of any device, including optical scanners, is the volume occupied by the device as well as the distribution of that volume. Minimizing the volume required by an element or component of a device is advantageous. A disadvantage of the known resonant optical scanners, such as described in the above-mentioned patents, is the arrangement in which the torsion bar (which can be geometrically considered a line) is arranged perpendicular or nearly perpendicular to the plane in which the optical beam sweeps (see for example FIG. 3 of U.S. Pat. No. 4,588,887). The arc swept by the optical beam as it undergoes its scanning action is constrained by, for example, the size of the region we want to "read" or "write". Thus we cannot make arbitrary changes in the dimensions of our scanner in this plane. Likewise, we cannot make arbitrary changes in the dimensions of the torsion bar, for it is the dimensions of the torsion bar which dictate the scanning motion, by dictating the motion of the mirror. The disadvantage of the prior art arrangements is that they all arrange the torsion bar generally perpendicular to the plane of the sweep. Accordingly, we are constrained in reducing the volume of the sweeping device in all three dimensions, two of the dimensions are defined by the scanning plane, and the third dimension is controlled by the length of the torsion bar.

It is an object of the invention to provide a mechanical optical scanning device or optical printhead which avoids the disadvantages of the prior art. It is another object of the present invention to arrange, in a resonant optical scanner, the torsion bar, so that the torsion bar does not intersect the plane of the sweep; in a preferred embodiment of the invention the torsion bar extends substantially parallel to the plane of the sweep. Alternatively, the torsion can exist on an axis lying in the plane of sweep. As a result, the dimension of the mechanical optical scanning device perpendicular to the plane of the sweep is freed from the limitations otherwise imposed by the length of the torsion bar supporting the scanning mirror.

In accordance with the preferred embodiment the mechanical optical scanning device includes a prefocused laser source, an optical scan subassembly, a scan detector and a resonant induction drive or galvanometer type scanner, collectively comprising a modular laser printhead. The laser and resonant galvanometer are field replaceable elements. The laser is arranged to be modulatable either in the form of an injection laser device (aluminum gallium arsenide) or a helium neon laser with an acousto optical integrated modulator driver. By arranging the torsion bar, supporting the scanning mirror, to be substantially or preferably parallel to the plane defined by the sweeping optical beam, printhead overall height can be reduced, resulting in a low profile printer. In one arrangement a 25% reduction in height was effected. The galvanometer scanner and its inductive drive can be sealed to prevent dust entering and sound being emitted.

The invention provides a compact optical scanner comprising:

a source of an optical beam;

a scan mirror;

a resonant galvanometer scanner supporting said scan mirror for oscillating motion about an oscillating axis; and optical means for conducting said optical beam from said source to said scan mirror and from said scan mirror to develop an optical beam scanning to and fro in a scan plane defined by said motion, wherein the improvement comprises orienting said resonant galvanometer scanner with said oscillating axis lying in or parallel to said scan plane.

BRIEF DESCRIPTION OF THE DRAWINGS

The present invention will now be described in the following portions of the specification when taken in conjunction with the attached drawings in which like reference characters identify corresponding apparatus and in which:

FIGS. 1-3 are respectively plan, front and side views of a laser printhead in accordance with the invention;

FIGS. 4, 5 and 6 are respectively three views of the scan unit,

FIG. 7 is an isometric illustrating the relation between the two major subassemblies of the printhead; and FIG. 8 is similar to FIG. 7 except broken away to show internal location of optical components.

DETAILED DESCRIPTION OF PREFERRED EMBODIMENTS

FIGS. 1, 2 and 3 are top side and edge views respectively of a preferred embodiment of the invention. As shown in the figures, the compact optical scanner of the invention includes two major subassemblies, a base unit 10 supporting a plurality of optical elements to be described and a scan unit 20 supported by the base unit 10 with a sealing engagement at the interface between the base unit and the scan unit. FIGS. 4, 5 and 6 are three views of the scan unit 20. As seen in FIG. 5, the rotating mirror 21 is supported by a torsion rod 24 supported on cantilevered leaf springs 23. The torsional axis 210 (see FIG. 8) of mirror 21 is adjusted during manufacture relative to mounting pins 22 (FIGS. 5, 6) to establish a reference between the torsional axis 210 and the scan plane. FIGS. 7 and 8 are respectively isometric and an isometric, broken away to show internal details.

Referring now to FIG. 1 which is a plan view, the base unit 10 supports a laser 100 and an adjacent laser focusing lens 101 (both of which are replaceable as an assembly). The base unit 10 includes provision for an optical path extending between the laser 100 and a first fold mirror 105. The first fold mirror 105 is supported in the casting 10 and oriented relative to the laser 100 to redirect the optical beam from the laser 100. The orientation of fold mirror 105 is shown best in FIG. 8. The fold mirror 105 is oriented so that the optical beam emitted by the mirror is emitted at an angle of about 35° to the impinging beam, in the same plane. The light beam, reflected from the mirror 105 impirges on a fixed mirror 110 which in one example can be inclined at approximately a 45° angle to the plane defined by the beam for laser 100 and mirror 105. The light beam reflected from the mirror 105 is reflected by the mirror 110 and directed toward the oscillating mirror 21. The oscillating mirror 21 is supported by the torsion bar 24 whose axis 210 is shown in FIG. 8. The mirror 21 and torsion bar 24 are supported in the scan unit 20 (see FIG. 5). As the torsion bar rotates about the axis 210, so too does the mirror 21 rotate about the same axis. The rotation of the mirror 21 is sufficient so that at one point in its rotation the beam reflected from the mirror 110 is re-reflected by the mirror 21 to impinge on the mirror 110 at the point A. As the mirror rotates, the beam reflected from the mirrors 105, 110 is re-reflected by the mirror 21 to impinge on the mirror 110 at the point B. Light reflected from the mirror 21 and impinging on the mirror 110 at the point A produces the ray 11A, and similarly the beam reflected by the mirror 21 to impinge on the mirror 110 at the point B produces the ray 11B. The rays 11A and 11B define the useful extent of the beam sweep as well as the scan plane 111. A lens 150 is traversed by rays 11A and 11B (as well as all rays lying therebetween). The rotation of the mirror 21, however, extends beyond the position which produces ray 11B so that the beam, at a later time, impinges on the mirror 110 at least at the point C. The point C is sufficiently far from the point B, so that light reflected from the mirror 21 to the mirror 110 at the point C is reflected to the fixed mirror 155, where that beam is reflected through the lens 156 and impinges on scan detector 157.

The scan unit 20 is supported on base unit 10, see FIG. 2. At the interface a seal for dust and sound is provided by suitable sealing material 25. The locating or reference pins 22 locate the oscillation axis 210 relative to the base unit 10, and thereby with reference to the scan plane 111.

Because of the characteristics of the torsion bar, the position of the mirror 21 when the beam is at points A, or B, or any point in between, can be inferred as some time delay from the point at which light is detected in the scan detector 157. Accordingly, the detector 157 can be used as a start of scan detector, as is more generally described in the co-pending application Ser. No. 879,247, filed June 27, 1986 and assigned to the assignee of this application.

It should be apparent from the foregoing that one significant advantage of the device shown in FIGS. 1-8, as compared to the prior art, is the orientation of the torsional axis 210 relative to the scan plane 111 (the plane defined between the beam paths 11A, 11B) and that relation is that the torsional axis is parallel or substantially parallel to this plane. One significant advantage is the volume reduction which can be occasioned by this orientation. In other words, we are not free to alter the length of the torsion bar, since the length of the torsion bar plays a part in determining the characteristic motion of the light beam. By orienting the torsional axis 210 (and hence the torsion bar 24) parallel or substantially parallel to the scan plane 111, a volume reduction of the entire scan assembly is occasioned.

Another significant advantage relates to the rotational inertial force that is generated during rotation. In accordance with the prior art technique (where the axis of the torsion bar is perpendicular to the scan plane) those rotational inertial forces lie in the scan plane. These forces can affect uniformity of pel placement in the scan direction which is antithetical to the desire for uniform pel placement. On the other hand, in accordance with the invention, these rotational inertial forces are normal to the scan plane. Forces in this direction can readily be controlled by securely mounting the base 10. In other words, while the forces in accordance with the present invention are not necessarily any less than the forces occasioned by the prior art arrangement, the forces in accordance with the present invention can be more readily controlled. In the preferred embodiment described herein, the torsional axis 210 is parallel to the scan plane 111. However, it should be apparent that the advantages of the invention will also be obtained if the torsional axis 210 is close to parallel to the plane 111 even though not exactly parallel.

Having thus described our invention, what we claim as new, and desire to secure by Letters Patent is:

1. A compact optical scanner comprising:
   a source of an optical beam,
   a scan mirror,
   a resonant galvanometer scanner supporting said scan mirror for oscillating motion about an oscillation axis,
   means for supporting said resonant galvonometer scanner with said oscillation axis lying substantially parallel to a scan plan,
   optical means for conducting said optical beam from said source to said scan mirror and from said scan mirror to develop an optical beam scanning to and fro in said scan plane which is defined by said scanning motion of said optical beam, wherein said optical means includes a fixed mirror both in a path from said source of said optical beam to said scan mirror and in a path from said scan mirror to said scan plane.

2. The scanner of claim 1 wherein said optical means further comprises:
   first fold mirror means redirecting a light beam emitted by said source to said fixed mirror,
   said fixed mirror inclined to said first fold mirror means and to said scan plane for directing said optical beam from said first fold mirror means to said scan mirror, and responsive to an optical beam reflected from said scan mirror for directing a scanning optical beam into said scan plane.

3. The scanner of claim 2 which includes a base unit and a scan unit, said base unit supporting said source of an optical beam, said first fold mirror means and said fixed mirror, and said scan unit supported by said base unit comprising said resonant galvonometer scanner and said scan mirror.

4. The scanner of claim 2 which includes a locating means in said scan unit to establish a reference between said oscillation axis and said scan plane.

5. The scanner of claim 2 which includes means to seal an interface of said base unit and said scan unit.

6. A low profile optical scanner comprising a base unit and a scan unit supported by said base unit, said scan unit including:
   a scan mirror,
   a resonant galvanometer scanner supporting said scan mirror for oscillating motion about an oscillation axis,
   means for supporting said resonant galvanometer scanner with said oscillator axis lying parallel to a scan plane,
   first means for referencing said oscillation axis to said scan plane, said base unit including:
   a source of an optical beam,
   optical means for conducting said optical beam from said source to said scan mirror and from said scan mirror to develop an optical beam scanning to and fro in said scan plane which is defined by said scanning motion of said optical beam,
   wherein said optical means includes a fixed mirror in a path from said optical source to said scan mirror and in a second path from said scan mirror to said scan plane.

7. The low profile optical scanner of claim 6 in which said optical means further includes:
   a fold mirror for redirecting an optical beam from said source to said fixed mirror.

8. The low profile optical scanner of claim 7 in which said optical means further includes mirror means for redirecting an optical beam from said scan mirror into a scan detector, wherein
   said scan detector, is located in said base unit for receiving an optical beam from said mirror means.

* * * * *

UNITED STATES PATENT AND TRADEMARK OFFICE
CERTIFICATE OF CORRECTION

PATENT NO. : 4,762,994

DATED : Aug. 9, 1988

INVENTOR(S) : Byerly et al

It is certified that error appears in the above-identified patent and that said Letters Patent is hereby corrected as shown below:

Col. 3, line 20, "impirges" should be -impinges-.

Col. 4, line 57, -for- should be inserted after "means".

Col. 5, line 1, -and- should be inserted after "unit";

line 3, "a" should be deleted.

Col. 6, line 18, "," should be deleted.

Signed and Sealed this

Twenty-fourth Day of January, 1989

Attest:

DONALD J. QUIGG

*Attesting Officer*  *Commissioner of Patents and Trademarks*